(12) United States Patent
Vedantham et al.

(10) Patent No.: US 11,368,393 B2
(45) Date of Patent: Jun. 21, 2022

(54) NETWORK ADDRESS ASSIGNMENT AND RECLAMATION FOR HIERARCHICAL BASED RPL NETWORKS

(71) Applicant: TEXAS INSTRUMENTS INCORPORATED, Dallas, TX (US)

(72) Inventors: Ramanuja Vedantham, Allen, TX (US); Kumaran Vijayasankar, Allen, TX (US); Arvind K. Raghu, Dallas, TX (US); Ariton E. Xhafa, Plano, TX (US)

(73) Assignee: Texas Instmments Incorporated, Dallas, TX (US)

( * ) Notice: Subject to any disclaimer, the term of this patent is extended or adjusted under 35 U.S.C. 154(b) by 20 days.

(21) Appl. No.: 16/696,150

(22) Filed: Nov. 26, 2019

(65) Prior Publication Data

US 2020/0099613 A1 Mar. 26, 2020

Related U.S. Application Data

(62) Division of application No. 15/249,716, filed on Aug. 29, 2016, now Pat. No. 10,491,514.
(Continued)

(51) Int. Cl.
*H04L 45/02* (2022.01)
*H04L 45/48* (2022.01)
*H04L 61/5007* (2022.01)

(52) U.S. Cl.
CPC .............. *H04L 45/48* (2013.01); *H04L 45/02* (2013.01); *H04L 61/2007* (2013.01)

(58) Field of Classification Search
CPC ............................ H04L 45/74; H04L 12/741
See application file for complete search history.

(56) References Cited

U.S. PATENT DOCUMENTS

2007/0206537 A1\* 9/2007 Cam-Winget ........ H04W 12/06
370/331
2011/0228788 A1 9/2011 Thurbert et al.
(Continued)

FOREIGN PATENT DOCUMENTS

WO 20120831134 A1 6/2012
WO 2013131867 A1 9/2013

OTHER PUBLICATIONS

Ouentin Lampin et al., "QoS Oriented Opportunistic Routing Protocol for Wireless Sensor Networks", Nov. 21, 2012 IEEE.
(Continued)

*Primary Examiner* — Sulaiman Nooristany
(74) *Attorney, Agent, or Firm* — Brian D. Graham; Charles A. Brill; Frank D. Cimino (57) ABSTRACT

Disclosed embodiments relate to a Hierarchical Do-Dag based RPL (H-DOC) network configuration where the network address of each node corresponds to its location within the hierarchical network. Network addresses are initialized hierarchically. Candidate patent nodes signal availability. Candidate child nodes respond to a selected candidate parent node with a temporary address. The selected candidate parent node acknowledges selection and communicates a hierarchical address for the child node in a transmission to the temporary address. The child node changes its address to the hierarchical address from the parent node. When a node switches parent nodes, it signals the old parent node to deallocate it as a child node, and then signals a selected candidate parent node with a temporary address.

20 Claims, 5 Drawing Sheets

Related U.S. Application Data (60) Provisional application No. 62/211,512, filed on Aug. 28, 2015.

(56) References Cited

U.S. PATENT DOCUMENTS

2012/0117208 A1* 5/2012 Shaffer ............... H04L 61/6068
709/221
2019/0004587 A1 1/2019 Van Wyk et al.

OTHER PUBLICATIONS

Jakob Eriksson et al., "DART: Dynamic Address RouTing for Scalable Ad Hoc and Mesh Networks" IEEE/ACM transactions on Networking, New York, US, vol. 15, No. 1, Feb. 1, 2007, pp. 119-132.

Cosmin Cobarzan et al., "Analysis and Performance Evaluation of RPL Under Mobility", 2014 IEEE Symposium on Computers and Communications (ISCC), IEEE Jun. 23, 2014, pp. 1-6.

Ines El Korbi et al., "Mobility enhanced RPL for Wireless Sensor Networks", Network of the Future (NOF)2012 Third International Conference on the, IEEE, Nov. 21, 2012, pp. 1-8.

Emilio Ancillotti et al., "On the Interplay Between RPL and Address Autoconfiguration Protocols in LLNs", 2013 9th International Wireless Communications and Mobile Computing Conference (IWCMC), IEEE, Jul. 1, 2013, pp. 1275-1282.

Emilio Ancillotti et al., "The Role of the RPL Routing Protocol for Smart Grid Communications", IEEE Communications Magazine, IEEE Service Center, Piscataway, US, vol. 51, No. 1, Jan. 1, 2013, pp. 75-83.

Japanese Office Action for JP 2018-530650 dated Sep. 2, 2020.

Lampin, et al.; "QoS Oriented Opportunistic Routing protocol for Wireless Sensor Networks"; Universite de Lyon, INRIA, INSA-Lyon; 2012; 9 pages.

Winter, et al.; "IPv6 Routing Protocol for Low-Power and Lossy Networks"; Internet Engineering Task Force (IETF) Mar. 2012; 3 pages.

First Office Action for Chinese Application No. 2016800473182 dated Apr. 10, 2020.

* cited by examiner

NETWORK ADDRESS ASSIGNMENT AND RECLAMATION FOR HIERARCHICAL BASED RPL NETWORKS

CROSS-REFERENCE TO RELATED APPLICATION(S)

This application is a divisional of U.S. patent application Ser. No. 15/249,716 filed Aug. 29, 2016, which claims priority to U.S. Provisional Patent Application No. 62/211,512 filed Aug. 28, 2015, all of which are incorporated by reference herein.

TECHNICAL FIELD

The technical field of this invention is network communication including nodes having alterable addresses.

BACKGROUND

Ad hoc wireless communications networks are formed dynamically as nodes come within range of existing network resources. These networks may be utilized in many applications to provide communications between lower level devices on the networks such as sensors and upper tier devices communicating with these sensors. The sensors typically operate with limited processing and memory and are often constrained by various technical limitations. Such limitations may include issues related to power consumption, small form factors and communication challenges (low speed, high error rates, and so forth) used to form the respective networks. The challenges are further complicated as there can be interdependence between the issues. For example, the level of communication within the networks impacts the power consumption in the network devices.

This disclosure relates to address generation for such ad hoc communications networks. A network includes at least two nodes that employ a routing protocol to communicate across the network. The routing protocol can be a Routing for Low Power (RPL) networks protocol, for example. One of the nodes is a parent node and other nodes are child nodes of the parent node. In some cases, the parent node can be a root node which is at the top of a hierarchical network. In other cases, the parent node can also be an intermediate node that is downstream from the root node yet can have other child nodes, sometimes referred to as leaf nodes, communicating with it.

SUMMARY

An address generator assigns a unique network address to each node by appending an address value of a number of bits to a parent address of the parent node to create the unique network address for the child node. In this manner, each node in the network can assume its identity in part from its respective parent while creating a unique network address via various assignment protocols disclosed herein. The address assignment protocol allows each node to know which is the next hop in the ad hoc network for message routing since each node can determine whether to route a message upstream or downstream based on its derived parental address assignment. This alleviates the need for routing tables as with conventional systems and thereby conserves memory in the respective nodes of the system. Moreover, handshaking in the network is reduced since each intermediate node that encounters a new child node does not have to communicate additional address announcements to the network since the incoming node is already a part of the parent's node address. Reducing handshaking communications reduces the power expended in the system.

BRIEF DESCRIPTION OF THE DRAWINGS

These and other aspects of this invention are illustrated in the drawings, in which.

DETAILED DESCRIPTION

Figure 1:
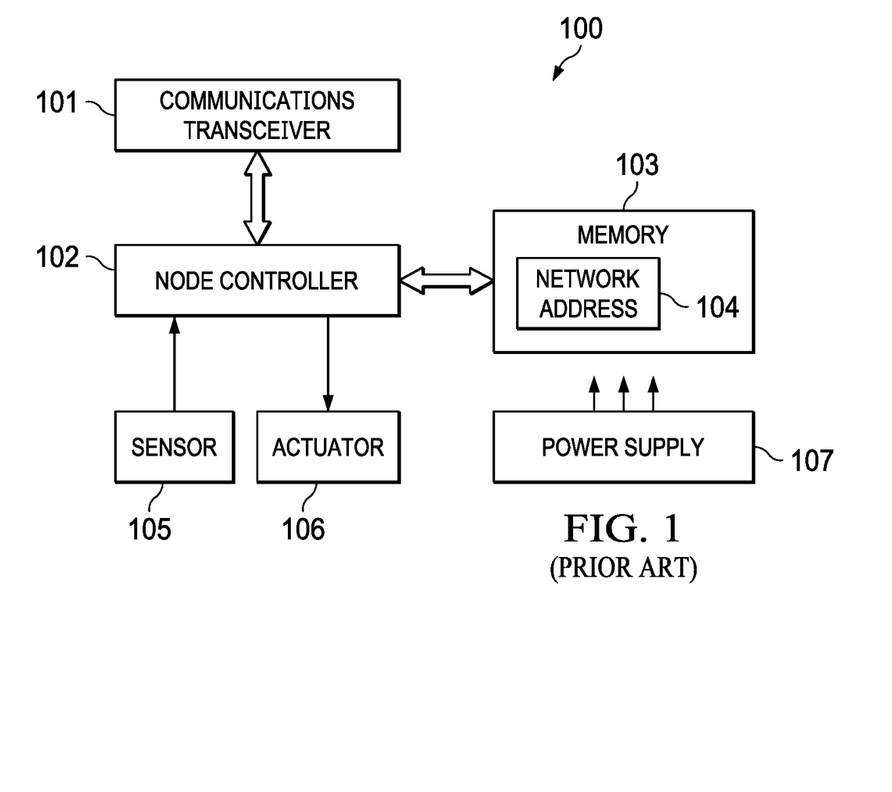
FIG. 1 is a block diagram of exemplary node (prior art)

FIG. 1 is a flow chart of an exemplary node 100 of this invention (prior art). Node 100 is one of a plurality of nodes typically employed. Node 100 includes communications transceiver 101. Communications transceiver 101 enables bi-directional communication with other nodes. In accordance with the known art, each node is provided with a communications address. Node 100 is only responsive to communications having a message header identifying node 100 as the destination node. This identification if typically made by the destination node's communications address. The node communications address is described more fully below. Node 100 illustrated in FIG. 1 is not limited to a particular communications medium. It is typical to provide wireless communication between nodes via low power radio frequency signals.

Node 100 includes node controller 102. Node controller 102 typically includes a programmable microprocessor. This microprocessor of node controller 102 provides the operating features of node 100. Node controller 102 may exchange messages with other node via a bi-directional connection to communications transceiver 101. As known in the art the microprocessor of node controller 102 is programmed by instructions stored in memory 103. Memory 103 typically includes both non-volatile memory, whose contents do not depend upon continual electrical power, such as read only memory (ROM) or FLASH memory, and volatile memory, commonly known as random access memory (RAM), whose contents are lost on interruption of electrical power. Typically program instructions are stored in non-volatile memory and more ephemeral data is stored in volatile memory. Node controller 102 communicates with sensor 105 and actuator 106 (described below) and with other nodes via communications transceiver 101. As illustrated in FIG. 1, memory 103 includes at least a portion 104 devoted to storing a network address assigned to the node 100. As will be described below, node 100 is only responsive to messages having a destination address matching network address 104 stored in memory 103.

Node 100 optionally includes one or more sensors 105 or actuators 106. Typically plural nodes such as node 100 are employed together. The sensors 105 detect environmental conditions for use by the network of nodes. These environmental conditions could be ambient temperature, wind speed, pressure and the like. The actuators 106 may be used to control the environment according to commands received from the network of nodes. An actuator may include an electrical switch, a fluid valve or control of motive parts of node 100. Any particular example of a node may include one or more sensors and one or more actuators, only one sensor or only one actuator.

Node 100 includes power supply 107. In the typical application node 100 is designed to employ very little electric power. Power supply 107 may be a small battery. In other applications power supply 107 is designed to scavenge power from the environments. This could be a solar cell with a back-up capacitor or other power storage for dark intervals. Alternatively, this could be some sort of motion capture device that generates electric power from environmental motion. An example is a weather buoy that generates electric power from wave motion.

Figure 2:
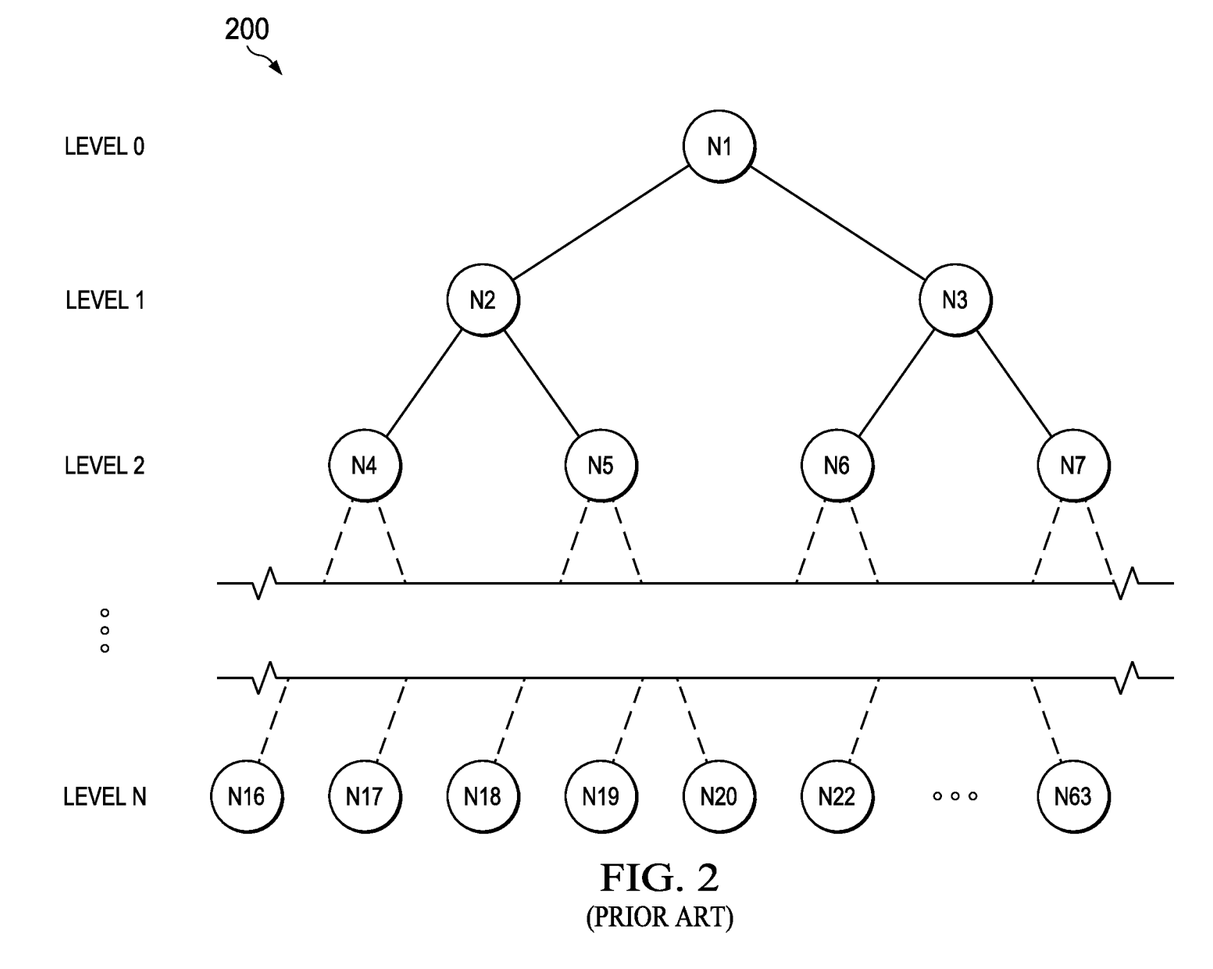
FIG. 2 illustrates a hierarchical network of nodes (prior art)

FIG. 2 illustrates a prior art preferred communication among nodes in a network of such nodes. In the preferred embodiment the nodes are disposed in a hierarchical network. Network 200 illustrates a single Level 0 node N1 also known as the root node. Level 0 node N1 communicates directly with Level 1 nodes N2 and N3. Level 1 node N2 communicates directly with Level 2 nodes N4 and N5. Level 1 node N3 communicates directly with Level 2 nodes N6 and N7. Level N nodes N16 to N63 communicate directly with Level N−1 nodes (not shown). The Top Level node N1 thus directly communicates with only child nodes N2 and N3. Level 1 node N2 communicates with parent node N1 and child nodes N4 and N5. Level 1 node N3 communicates directly with parent node N1 and with child nodes N6 and N7. At the bottom level (Level N) each node N16 to N64 communicates directly its respective parent node (not shown).

As noted above, a network of nodes according to this invention typically employs wireless communication between nodes via low power radio frequency signals. Thus a parent node is not hardwired to its child nodes. All the wireless communication may share one or just a few radio frequencies. This environment requires some manner for a node to determine whether a communication is intended for it. Such networks typically employ a network address to distinguish communications. Each node in the network is assigned a network address. Each communication in the network includes reference to the network address of the destination node. This destination node network address is typically specified in a message header. Upon receiving a communication, each node extracts the destination node network address from the message. The node compares this destination node network address with its own network address. The node responses to the message if the destination node network address matches its own network address. The node ignores this communication if the destination node network address does not match its own network address. The node may also route the message to its parent node or one of its child nodes in an attempt to reach the destination node. It is typical for a node to handle (service or route) only messages from its parent node or from one of its child nodes.

Provision of network address for destination nodes identifies the desired node. The destination network address does not automatically provide information on routing. In the preferred embodiment using low power radio frequency signals for communication, not all nodes will be in range of all other nodes. In the preferred embodiment only a parent node and its child node(s) are guaranteed to be in communication. Thus a communication directed to another node must either be sent up the hierarchy to the patent node or down the hierarchy to an appropriate child node.

The communications between parent and child nodes occur according to a network routing protocol. The routing protocol can be Routing for Low Power Networks (RPL) protocol, for example. The parent node can be a root node or an intermediate node and the child node can be a leaf node to the root node or the intermediate node in a destination oriented directed acyclic graph (DODAG) configuration. The DODAG consists of at least one root node and at least one leaf node.

In order to properly route a communications directed to another node, each node must access routing information for the destination node. The RPL routing protocol has two modes of operation. The first mode is the storing mode. The second mode is the non-storing mode. In the RPL protocol storing mode, each node stores information for routing to all other nodes in memory 103. Upon receipt a communication node controller 102 extracts the destination node address. If this address matches the node address, the node responds to the communication. If this destination node address does not match the node address, the node must route the communication to another node. Node controller 102 consults the stored routing information to determine the routing of the communication. The routine table need only indicate whether the communication is to be routed up the hierarchical network or down the hierarchical network to one of the node's child nodes. This technique is disadvantageous because it requires storing a routing table at each node. This is a burden on hardware because it requires memory and power at each node to store the routing table. The routing table size is linearly proportional to the number of child nodes for that node plus one additional entry for the parent. This is disadvantageous for low cost, low power nodes. In the RPL protocol non-storing mode, only the root node stores information for routing. All communications between any pair of nodes must first be routed up the root node. The root node routes the communication to the appropriate child and grandchild nodes based upon its routing table. This technique eliminates the requirement for storing a routing table at each node. However, this technique increases the communications traffic due because all communications must pass through the root node.

The network configuration illustrated in FIG. 2 is known as a directed acyclic graph (DODAG) configuration. As shown in FIG. 2, the DODAG consists of at least one root node and at least one leaf node. Candidate parent nodes transmit DODAG information object request (DIO) signals indicating their availability as a parent node. Candidate child nodes respond with a Destination Advertisement Object (DAO) signal to their preferred parent node in response to a DIO.

Figure 3:
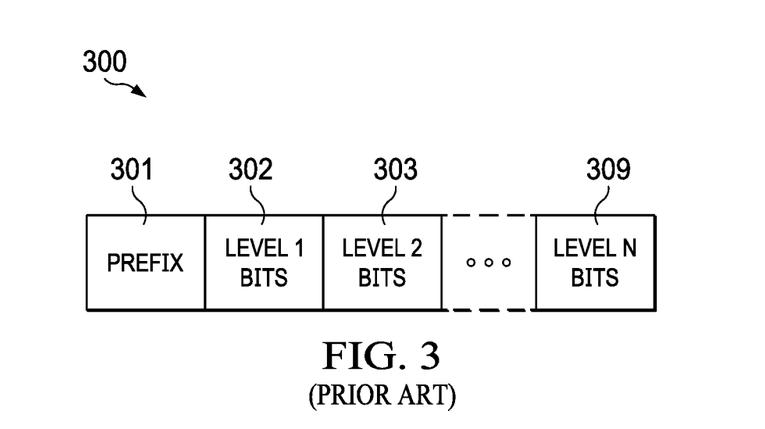
FIG. 3 view of address segments in a hierarchical network address technique (prior art)

FIG. 3 illustrates features of a prior art hierarchical Do Dag based RPL network (H-DOC) addressing technique advantageously used with the hierarchical network illustrated in FIG. 2. For each node network address 300 includes prefix bits 301, level 1 bits 302, level 2 bits 303 . . . level N bits 309. Prefix bits 301 includes bits common to all nodes in the network and bits associated with the root node. All nodes within the hierarchical network include the bits in prefix bits 301. For the root node of the network all other bit fields (302, 303 . . . 309) have a predetermined null value such as all 0s. Each node at level 1 includes prefix bits 301 having the same value as the root node and a unique value within the level 1 bits 302 from all other level 1 nodes. For level 1 nodes all other bit fields (303 . . . 309) have the predetermined null value. Each node at level 2 includes prefix bits 301 having the same value as the root node, level 1 bits 302 having the same value as its parent node and a unique value within the level 2 bits 302 from among all other level 2 nodes having the same parent level 1 node. For level 2 nodes all other bit fields ( . . . 309) have the predetermined null value. The number of address bits assigned to each level field is a design choice dependent upon the desired parent-child fan out. Note that the order of the level fields within the network address is arbitrary. That is, the level fields can be in any order and not just the high bits to low bits order illustrated in FIG. 3. It is merely required that all nodes within the network employ the same level field order.

One feature of this hierarchical network address technique is that the network address of each node corresponds to its location within the hierarchical network. Each node has a network address dependent upon its parent node and all intermediate nodes up the hierarchy to the root node. This simplifies the routing decision made at each node.

Figure 4:
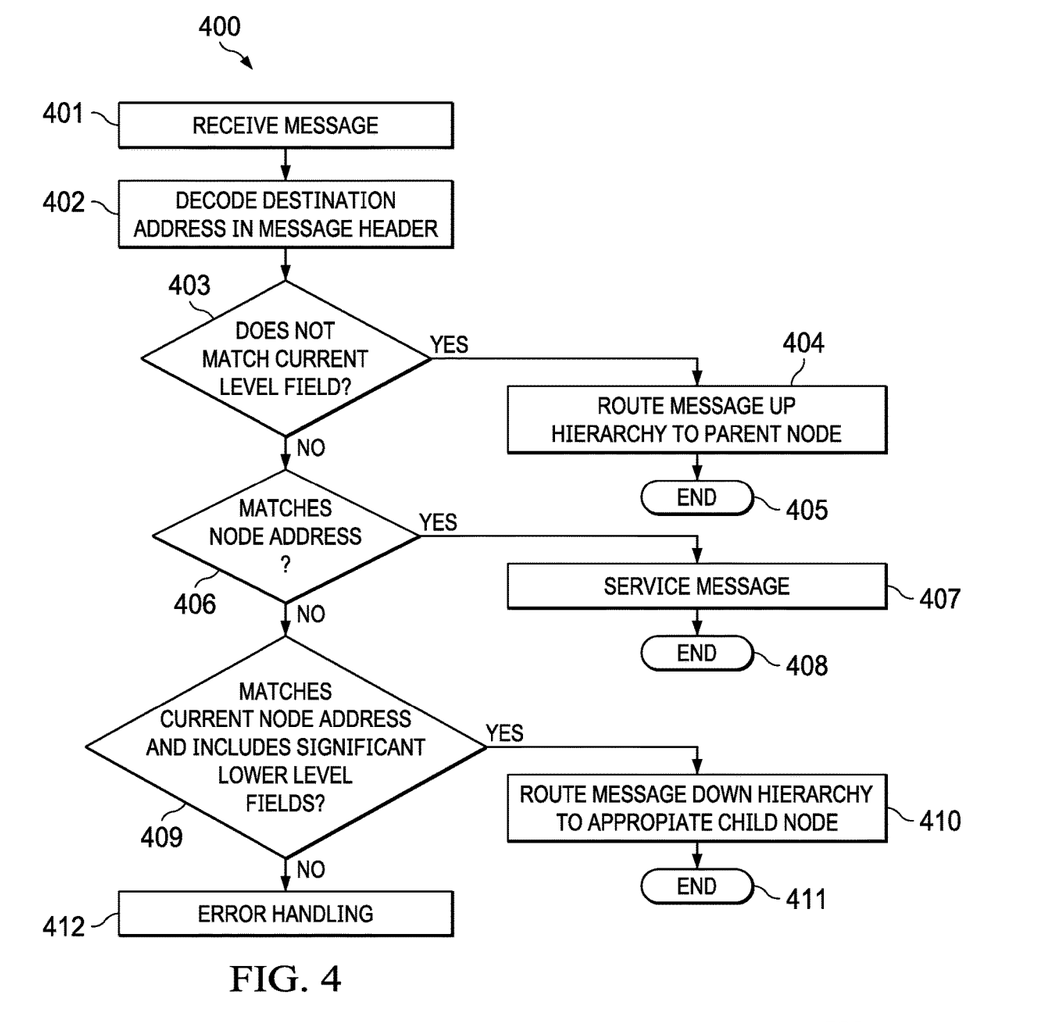
FIG. 4 is a flow chart illustrating message routing when employing the hierarchical network address technique of FIG. 3.

FIG. 4 illustrates a flow chart of the process 400 for handling message routing when employing hierarchical addresses. In the preferred embodiment, memory 103 at each node stores instructions causing node controller 102 to perform this process. There are three routing possibilities. The message may need to be routed the parent of the current node up the hierarchy. The message may be intended for the current node. The message may need to be routed to a child node of the current node down the hierarchy. A message received from the parent node of the current node may be directed to the current node or need to be routed to a down hierarchy node. A message from a child node may need to be routed to the parent node up the hierarchy, may be directed to the current node or need to be routed to a down hierarchy to another child node.

Process 400 begins upon receipt of a message from another node (block 401). The node extracts the destination address from the message header (block 402). The routing of the message depends upon the relationship of the destination address to the node address of the current node.

Test block 403 determines if the destination address matches higher level address slots of the current node address and does not match current level address of the current node address. If so (Yes at test block 403), then the message should be routed up the hierarchy. Block 404 routes the message to the parent node of the current node. Following this routing of the message in block 404, process 400 ends at end block 405. If not so (No at test block 403), then flow passed to test block 406.

Test block 406 determines if the destination address matches the address of the current node including predetermined null values for level fields below the current node level. If the destination address matches the address of the current node including predetermined null values for level fields below the current node level (Yes at test block 406), then the current node is the intended destination. Accordingly, block 407 services the message. The exact manner of servicing the message depends upon the intended use of the network. The message could be a request for data from a sensor 104 at the current node. The message could be a command to take some action via actuator 105 the current node. The exact nature of servicing this message is beyond the scope of this invention. Following service of the message in block 407, process 400 ends at end block 408.

If the destination address does not match the address of the current node including predetermined null values for level fields below the current node level (No at test block 406), then the current node is not the intended destination. Test block 409 determines if the destination node address matches the fields of the current node address and further includes significant lower level address fields. If this is true (Yes at test block 409), then the message is routed to a child node of the current node. Block 410 routes the message down hierarchy to an appropriate child node. The appropriate child node is determined by the level address field one level below the level of the current node. Following this routing of the message in block 410, process 400 ends at end block 411.

If none of these conditions are met (No at test block 403, No at test block 406 and No at test block 409), then there is an error in the destination address. Error handling block 412 handles this error. This is beyond the scope of this invention.

There are serious limitations in practical implementation of the H-DOC technique. There is no clean way to assign node addresses in the network. There is no provision for reassigning node address. It is complicated or impossible for a node to change its parent node. Such a change may be needed if the nodes are mobile. This invention, addresses the limitations of the H-DOC technique for address assignment and reassignment for mesh networks. This invention slightly modifies two messages used in RPL networks employing the H-DOC technique. In the prior art, a node sends a DODAG information object request (DIO) message to its potential child nodes. A child node desiring to connect to that node responds with a Destination Advertisement Object (DAO) message. In general, each node connects with its parent node before attempting to connect with a child node. This invention provides better assignment of network addresses in the hierarchical network.

Figure 5:
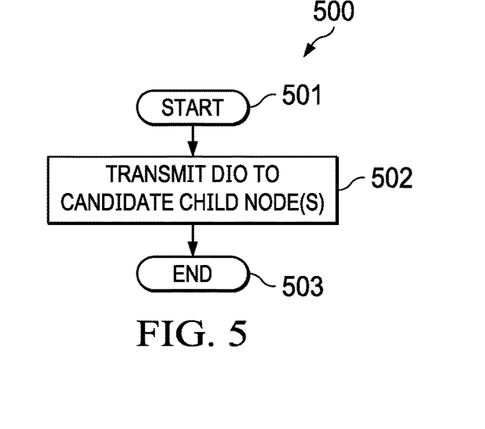
FIG. 5 is a flow chart illustrating actions of a potential parent node in network address initialization according to this invention.
Figure 6:
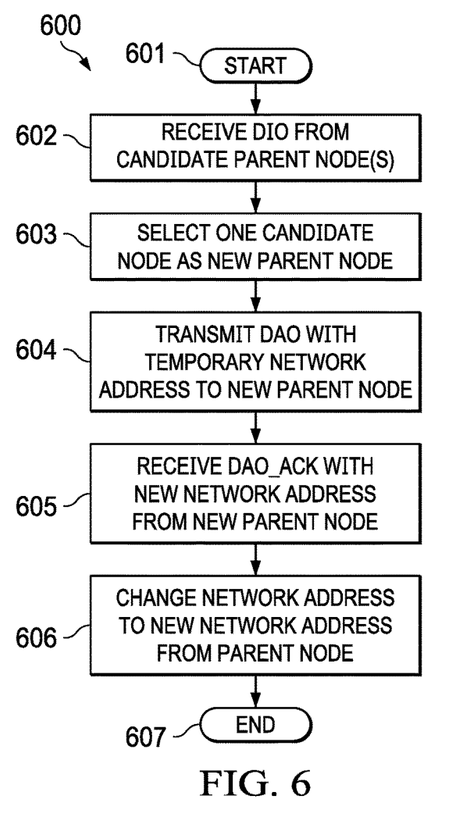
FIG. 6 is a flow chart illustrating actions of a potential child node in network address initialization according to this invention.
Figure 7:
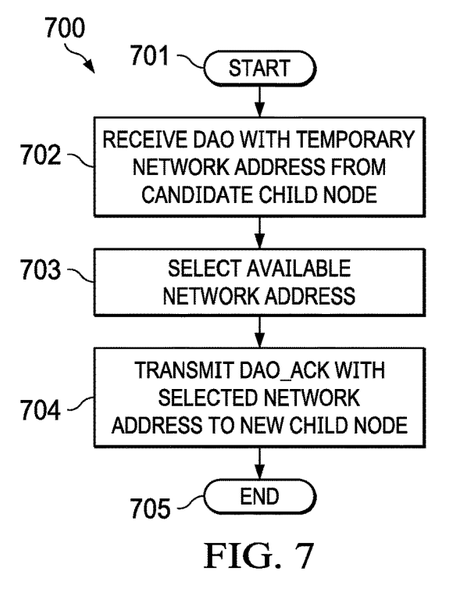
FIG. 7 is a flow chart illustrating actions of a chosen parent node in network address initialization according to this invention.

FIGS. 5 to 7 together illustrate hierarchical address initialization according to this invention. FIG. 5 illustrates process 500 taking place on candidate parent nodes. FIG. 6 illustrates process 600 taking place on candidate child nodes. FIG. 7 illustrates process 700 taking place on a chosen parent node.

FIG. 5 illustrates process 500 on a candidate parent node beginning at start block 501. In the preferred embodiment, memory 103 at each node stores instructions causing node controller 102 to perform this process. The candidate parent node broadcasts a DIO signal at block 502. The DIO signal is similar to the prior art. The DIO signal announces the transmitting node's availability as a parent node and its network address. This DIO signal is typically broadcast to all candidate child nodes of the transmitting node. Such a broadcast is possible in the typical network using wireless communication. The initialization process preferably starts with the root node and proceeds down the hierarchy. The root node is assumed to know it is the root node and begins initialization. A node cannot transmit a DIO signal to connect to child nodes until it has been attached to a parent node. Transmission of a DIO signal indicates that the current node can accept at least one node as a child. Thus this guarantees that the current node has fewer than the maximum number of child nodes assigned as limited by the size of the next level field in FIG. 3. Process 500 ends with end block 503.

FIG. 6 illustrates process 600 of a candidate child node. In the preferred embodiment, memory 103 at each node stores instructions causing node controller 102 to perform this process. Process 600 begins at start block 601. The candidate child node receives at least one DIO signal from a candidate parent node at block 602. The candidate child node selects a parent node from among the received DIO signals. The manner of this selection is not important to this invention. This selection includes identifying the network address of the selected parent node from the received DIO signal. In block 604 the node transmits a DAO signal to the selected parent node. This DAO signal is directed to the selected parent node via a destination network address matching the network address of the selected parent node extracted from the DIO signal. In accordance with this invention, this DAO signal includes information regarding a temporary network address to which the transmitting node will be responsive. This temporary node address may an address selected from a set of node addresses set aside for this purpose.

FIG. 7 illustrates process 700 taken by a selected parent node. In the preferred embodiment, memory 103 at each node stores instructions causing node controller 102 to perform this process. Process 700 begins with start block 701. The selected parent node receives a DAO signal in block 702. As noted above this DAO signal is directed to the current node by destination address and includes an indication of the temporary address of the child node. In block 703 the process 700 selects an available network address to assign to the requesting node. As noted above, this node transmitted a DIO signal (block 502) indicating availability as a parent node. This guarantees that the current node can accept another child node. This node stores an indication of the network addresses of currently assigned child nodes. Process 700 then transmits a DAO_ACK signal back to the requesting node (block 704). This DAO_ACK signal is transmitted to the temporary address of the received DAO signal (block 702). This DAO_ACK signal includes a payload indicating the network address assigned to this child node in block 703. As indicated in conjunction with FIG. 3, according to the hierarchical address technique this assigned address includes high level fields down to the level of the parent node identical to the network address of the parent node. The field one level below the level of the parent node is set to an unused address from among currently assigned child nodes, if any. Process 700 ends with end block 705.

Process 600 (FIG. 6) continues at block 604. The node receives a DIA_ACK signal from the selected parent node (block 605). As noted above this DAO_ACK signal includes a child network address assigned by the selected parent node. The child node then changes its network address to the assigned address included in payload of the DAO_ACK transmission (block 606). The current node then is responsive to this newly assigned child address in a manner described above. Process 600 ends with end block 607. As previously described, upon this assignment of network address this child node may transmit a DIO signal indicating it can be a parent node to other nodes.

Figure 8:
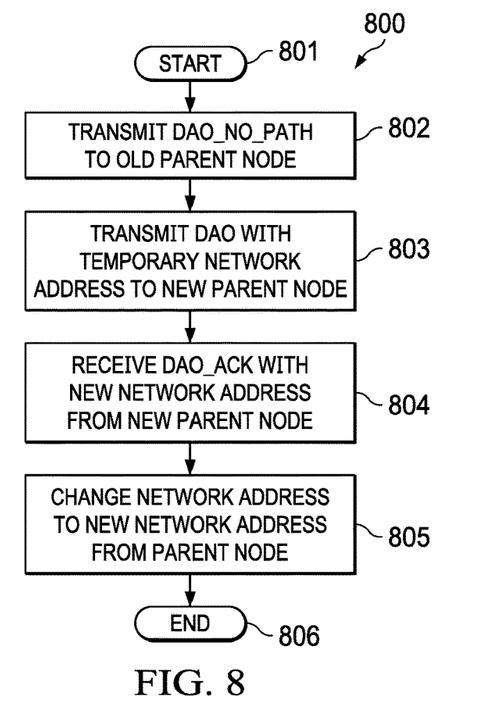
FIG. 8 is a flow chart illustrating actions of a child node when changing patent nodes according to this invention.
Figure 9:
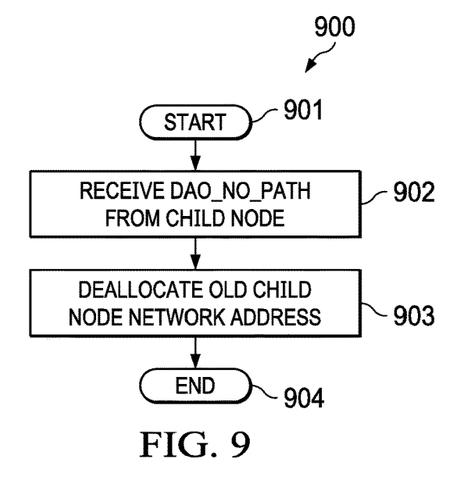
FIG. 9 is a flow chart illustrating actions of the old patent node when changing patent nodes according to this invention.
Figure 10:
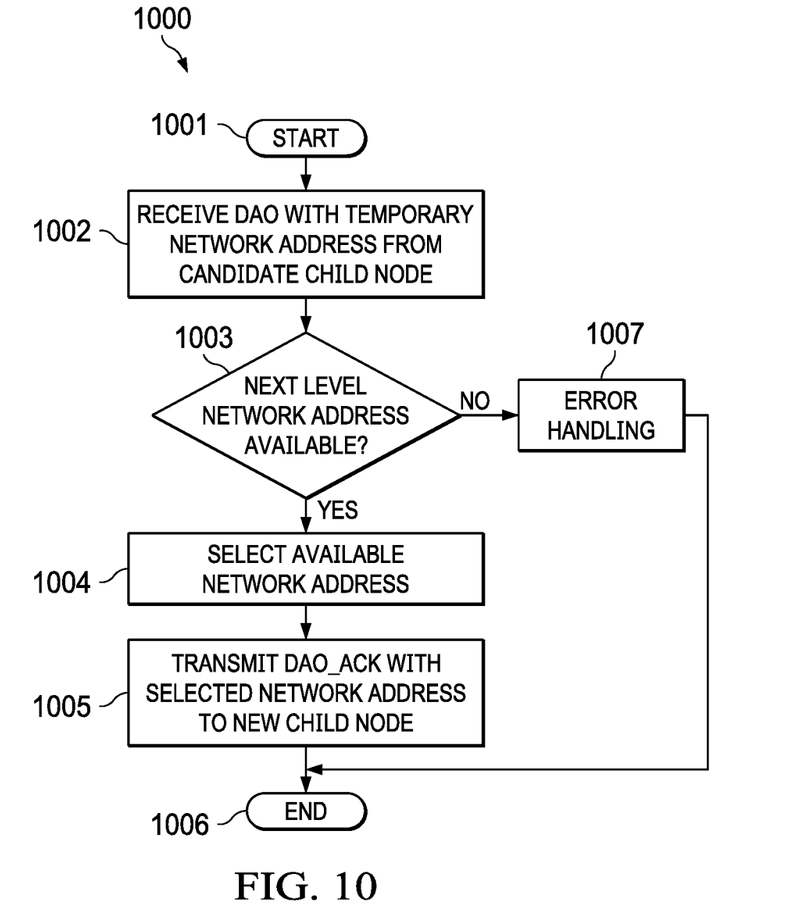
FIG. 10 is a flow chart illustrating actions of the new patent node when changing patent nodes according to this invention.

The prior art hierarchical address technique did not provide a manner of rearranging the network once initialized. If the network includes mobile nodes, a node may move to a location where its current patent node is more accessible. Due to the hierarchical nature of the address, this requires reassignment of the address of the child node. FIGS. 8 to 10 illustrated this process. FIG. 8 illustrates process 800 taking place on the moving child node. FIG. 9 illustrates process 900 taking place on the old parent node. FIG. 10 illustrates process 1000 taking place on the new parent node.

FIG. 8 illustrates process 800 taking place on the moving child node. In the preferred embodiment, memory 103 at each node stores instructions causing node controller 102 to perform this process. Process 800 begins at start block 801. It is assumed that the child node has determined to change parent nodes and that it has selected the identity (and hence the network address) of the new parent node. Process 800 transmits a new signal DAO_NO_PATH to the old parent node. The child node directs this transmission to the network address of the old parent node. This DAO_NO_PATH signal also identifies the transmitting node preferably by the old network address.

FIG. 9 illustrates process 900 taking place on the old parent node. In the preferred embodiment, memory 103 at each node stores instructions causing node controller 102 to perform this process. Process 900 begins with start block 901. The old parent node receives a DAO_NO_PATH signal at block 902. In response to the DAO_NO_PATH signal the old parent node deallocates the address assigned to the transmitting node (block 903). Thus the old parent node is no longer the parent of the transmitting node. Process 900 ends at end block 904.

Returning to FIG. 8, following transmission of the DAO_NO_PATH signal the moving child node transmits a DAO signal to the selected new parent node (block 803). This process is similar block 604 described above. The DAO signal includes a destination node indicating the selected new parent node. The DAO signal also includes a temporary node address for reply. This temporary node address may be the prior address. Note the old parent node has deallocated this node address and will not attempt to communicate with the moving child node via this address. This temporary node address may an address selected from a set of node addresses set aside for this purpose.

FIG. 10 illustrates process 1000 taking place on the new parent node. In the preferred embodiment, memory 103 at each node stores instructions causing node controller 102 to perform this process. Process 1000 begins with start block 1001. At block 1002 the new parent node receives a DAO signal which includes an indication of the temporary address of the child node. In test block 1003 process 1000 determines whether a network address is available for a new child node. This slightly differs from process 700 illustrated in FIG. 7. In process 700 the node has transmitted a DIO signal indicating availability to accept a new child node. In process 1000 the selected parent node may not have a network address available to allocate to another child node. If the new parent node has an available network for allocation to a new child node (Yes at test block 1003), the process 1000 selects an available network address for allocation to the requesting node in block 1004. Process 1000 then transmits a DAO_ACK signal back to the requesting node (block 1006). This DAO_ACK signal is transmitted to the temporary address of the received DAO signal (block 1002). This DAO_ACK signal includes a payload indicating the network address selected for this child node in block 1004. Process 1000 ends with end block 1006.

If the new parent node does not have an available network for allocation to a new child node (No at test block 1003), the process 1000 begins error handling in block 1007. This error handling may be failing to respond to the DAO signal. This relies upon the requesting child node to note the lack of response (via a time out for example) and select another new parent node. This may be by sending a not acknowledge (NAK) signal to the requesting node. The requesting node responds to the NAK signal by selecting another new parent node and transmitting a new DAO signal. Following error handling, process 1000 ends with end block 1006.

Returning to FIG. 8, following transmission of the DAO signal (block 804), process 800 continues at block 804 by receiving the DIA_ACK signal from the new parent node. As noted above this DAO_ACK signal includes a network address assigned by the new parent node. The child node then changes its network address to the assigned address included in the DAO_ACK transmission (block 807). The current node then is responsive to this newly assigned child address in a manner described above. Process 800 ends with end block 806.

This invention may be practiced employing a MAC_ACK signal rather than the DAO_ACK signal. This MAC_ACK signal similarly is directed to the temporary address of the requesting child node and includes the newly assigned network address as part of the payload.

This invention has the following advantages in network address assignment and reclamation. This invention is a simple and elegant solution for network address assignment, reclamation and reassignment. This invention uses the same underlying principles for all three aspects of address management. This invention is fully compliant with existing standards by using payload network address information. This invention does not incur any additional implementation overhead. This invention ensures that the hierarchical Do_Dag based RPL network (H-DOC) operates with a routing table size of 1 (corresponding to the node network address).

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results unless such order is recited in one or more claims. In certain circumstances, multitasking and parallel processing may be advantageous. Moreover, the separation of various system components in the embodiments described above should not be understood as requiring such separation in all embodiments.

What is claimed is:

1. A node comprising:
    a transceiver to communicate with one or more other nodes in a network, wherein the network is a Destination Oriented Directed Acyclic Graph (DODAG) network;
    a node controller coupled to the transceiver; and
    a memory coupled to the node controller to store a network address and instructions for a control program, wherein the control program, when executed by the node controller, is configured to cause the node controller to:
        in response to receiving, from another node in the network, a temporary address and a first signal indicating that the other node desires to be a child node of the node, wherein the temporary address is a prior address of the other node:
            select a hierarchical address for the other node, the hierarchical address including a first level address subset corresponding to the network address, a second level address subset selected to be unique to the other node, and at least one additional level address subset that includes predetermined null bits;
            cause the transceiver to transmit to the temporary address a second signal that includes an indication of the selected hierarchical address, wherein the second signal is a MAC acknowledgement (MAC_ACK) signal; and
            change, at the other node, the temporary address to the selected hierarchical address included in a payload of the second signal.

2. The node of claim 1, wherein the first signal is a Destination Advertisement Object (DAO) signal.

3. The node of claim 1, wherein the control program, when executed by the node controller, is configured to cause the node controller to allocate a child status to the other node in response to the transmitting of the second signal.

4. The node of claim 3, wherein the control program, when executed by the node controller, is configured to cause the node controller to, in response to receiving a third signal from the other node after the transmitting of the second signal, deallocate the child status of the other node.

5. A method for network address initialization in a network, wherein the network is a Destination Oriented Directed Acyclic Graph (DODAG) network, the method comprising:
    receiving, at a first node device of the network, a communication that includes a first signal indicating that a second node device wishes to establish a child relationship with the first node device and a temporary address corresponding to the second node device, wherein the temporary address is a prior address of the other node;
    selecting a hierarchical address for the second node device that includes a first level address subset corresponding to the network address, a second level address subset, and at least one additional level address subset that includes predetermined null bits, wherein the second level address subset is selected to uniquely identify the second node device;
    transmitting a second signal that indicates the selected hierarchical address to the temporary address, wherein the second signal is a DAO acknowledgement (DAO_ACK) signal; and
    changing the temporary address to the selected hierarchical address included in a payload of the second signal.

6. The method of claim 5, wherein the first signal is a Destination Advertisement Object (DAO) signal.

7. The node of claim 1, wherein the second level address subset does not immediately follow the first level address subset in the hierarchical address in order.

8. The node of claim 1, wherein the control program is configured to cause the node controller to:
    determine whether the node has a set of available network addresses, wherein the selecting of the hierarchical address for the other node, the causing of the transceiver to transmit the second signal, and the changing, at the other node, of the temporary address to the selected hierarchical address are based on the node having the set of available network addresses; and based on the node not having any available network address, causing the transceiver to transmit a third signal to the temporary address.

9. The node of claim 8, wherein the third signal is a not acknowledge (NACK) signal.

10. The method of claim 5 further comprising allocating a child status to the second node device.

11. The method of claim 5 further comprising:
receiving, at the first node device, a third signal from the second node device; and
based on the third signal, deallocating the hierarchical address from the second node device.

12. The method of claim 11, wherein the third signal is a DAO NO PATH signal.

13. The method of claim 5, wherein the second level address subset does not immediately follow the first level address subset in the hierarchical address in order.

14. The method of claim 5 further comprising:
determining whether the first node has a set of available network addresses, wherein the selecting of the hierarchical address, the transmitting of the second signal, and the changing of the temporary address to the selected hierarchical address are performed based on the first node having a set of available network addresses; and
when the first node does not have an available network address, transmitting a third signal.

15. The method of claim 14, wherein the third signal is not acknowledge (NACK) signal.

16. A first network device comprising:
a transceiver configured to couple to a Destination Oriented Directed Acyclic Graph (DODAG) network;
a node controller coupled to the transceiver; and
a memory coupled to the node controller configured to store a first network address associated with the first network device, wherein the memory includes instructions that, when executed by the node controller, cause the node controller to:
receive a first signal from a second network device over the DODAG network via the transceiver, wherein the first signal is associated with a second network address of the second network device;
based on the first signal, determine whether a third network address is available to allocate to the second network device, wherein the third network address is a hierarchical address and includes a first subset corresponding to the first network address, a second subset selected to be unique to the second network device, and a third subset that includes a set of null bits; and
based on the third network address being available:
cause the transceiver to transmit a second signal to the second network device that includes a payload that includes the third network address, wherein the second signal is a MAC acknowledgement (MAC_ACK) signal; and
cause the second network device to change from the second network address to the third network address.

17. The first network device of claim 16, wherein the memory includes further instructions that cause the node controller to, based on the third network address not being available, cause the transceiver to transmit a third signal to the second network device that indicates that no address is available.

18. The first network device of claim 17, wherein the third signal is a not acknowledge (NACK) signal.

19. The first network device of claim 16, wherein the memory includes further instructions that cause the node controller to:
receive a third signal from the second network device; and
based on the third signal, deallocate the third network address from the second network device.

20. The first network device of claim 19, wherein the third signal is a DAO NO PATH signal.

* * * * *